(12) United States Patent
Devaraj

(10) Patent No.: US 12,375,401 B2
(45) Date of Patent: Jul. 29, 2025

(54) OVERLAY ROUTE OPTIMIZATION ACROSS DATA CENTERS

(71) Applicant: Arista Networks, Inc., Santa Clara, CA (US)

(72) Inventor: Naveen Kumar Devaraj, Apex, NC (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 457 days.

(21) Appl. No.: 17/885,762

(22) Filed: Aug. 11, 2022

(65) Prior Publication Data

US 2024/0056390 A1  Feb. 15, 2024

(51) Int. Cl.
*H04L 45/64* (2022.01)
*H04L 12/46* (2006.01)
*H04L 61/103* (2022.01)

(52) U.S. Cl.
CPC .......... *H04L 45/64* (2013.01); *H04L 12/4641* (2013.01); *H04L 61/103* (2013.01)

(58) Field of Classification Search
CPC .... H04L 45/64; H04L 12/4641; H04L 61/103
See application file for complete search history.

(56) References Cited

U.S. PATENT DOCUMENTS

| | | | |
|---|---|---|---|
| 11,575,541 B1* | 2/2023 | Styszynski | H04L 12/4633 |
| 2017/0093703 A1* | 3/2017 | Natu | H04L 12/2852 |
| 2017/0093712 A1* | 3/2017 | Chopra | H04L 67/566 |

OTHER PUBLICATIONS

Y. Rekhter et al., "A Border Gateway Protocol 4 (BGP-4)", Jan. 2006, 104 pages.
T. Bates et al., "Multiprotocol Extensions for BGP-4", Jan. 2007, 11 pages.
A. Sajassi et al., "BGP MPLS-Based Ethernet VPN", Feb. 2015, 56 pages.
J. Rabadan et al., "IP Prefix Advertisement in Ethernet VPN (EVPN)", Oct. 2021, 31 pages.

* cited by examiner

*Primary Examiner* — Saad A. Waqas
(74) *Attorney, Agent, or Firm* — Fountainhead Law Group, PC

(57) ABSTRACT

The distribution of reachability information between data centers includes receiving routes that are advertised among network devices within a given data center. The received routes are summarized to produce one or more summarized (aggregated) routes which are fewer in number than the received routes. Instead of advertising the received routes among the data centers, the summarized routes are advertised. Advertising the summarized routes as compared to the received routes reduces control plane traffic between data centers, and reduces the requirements for storing advertised routes received by a data center.

16 Claims, 9 Drawing Sheets

| VTEP | EVPN Routes generated by Leaf VTEPs in DC 1 (FIG. 3) | | routes on DC-1 GW VTEP sent to DC-2 GW VTEP (FIG. 3) |
|---|---|---|---|
| | Local SVIs | Locally attached hosts in 10.0.9.0/24 subnet | |
| Leaf-1 VTEP (FIG. 3) | 10.0.0.0/24<br>10.0.1.0/24<br>10.0.2.0/24<br>10.0.3.0/24<br>10.0.4.0/24<br>10.0.5.0/24<br>10.0.6.0/24<br>10.0.7.0/24<br>10.0.9.0/24 — 822 | 10.0.9.2/32<br>10.0.9.3/32 | 10.0.0.0/21 — route, 812<br>10.0.9.0/29 — route, 814<br>10.0.9.0/24 — route, 816<br>10.0.9.12/32 — route, 818 |
| Leaf-2 VTEP (FIG. 3) | 10.0.0.0/24<br>10.0.1.0/24<br>10.0.2.0/24<br>10.0.3.0/24<br>10.0.4.0/24<br>10.0.5.0/24<br>10.0.6.0/24<br>10.0.7.0/24<br>10.0.9.0/24 — 822 | 10.0.9.4/32<br>10.0.9.5/32<br>10.0.9.6/32<br>10.0.9.7/32<br>10.0.9.12/32 — 824 | | table, 800 column, 802 (Type 5 routes)  column, 804 (Type 2 routes)  column, 806 (aggregated routes)

FIG. 8

OVERLAY ROUTE OPTIMIZATION ACROSS DATA CENTERS

BACKGROUND

Data center networks, campus networks, and the like (collectively referred to as "data centers") are network facilities that house routers, switches, firewalls, storage systems, servers, etc. to store and manage data and applications for their users. VxLAN (virtual extensible local area network) is a common networking technology for implementing the network infrastructure in a given data center. VxLAN requires manual configuration (e.g., by a network administrator), which is time-consuming and prone to error.

EVPN (Ethernet Virtual Private Network) is a common networking technology that operates with VxLAN to provide control plane functionality across the network within the data center to support a VxLAN deployment. EVPN uses MP BGP (multi-protocol, border gateway protocol) to distribute control plane functionality across the network in a data center. EVPN can also be used to provide Layer 2 (L2) VPN networking and Layer 3 (L3) VPN services across multiple data centers.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 8 shows an example to illustrate aggregation in accordance with the present disclosure.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
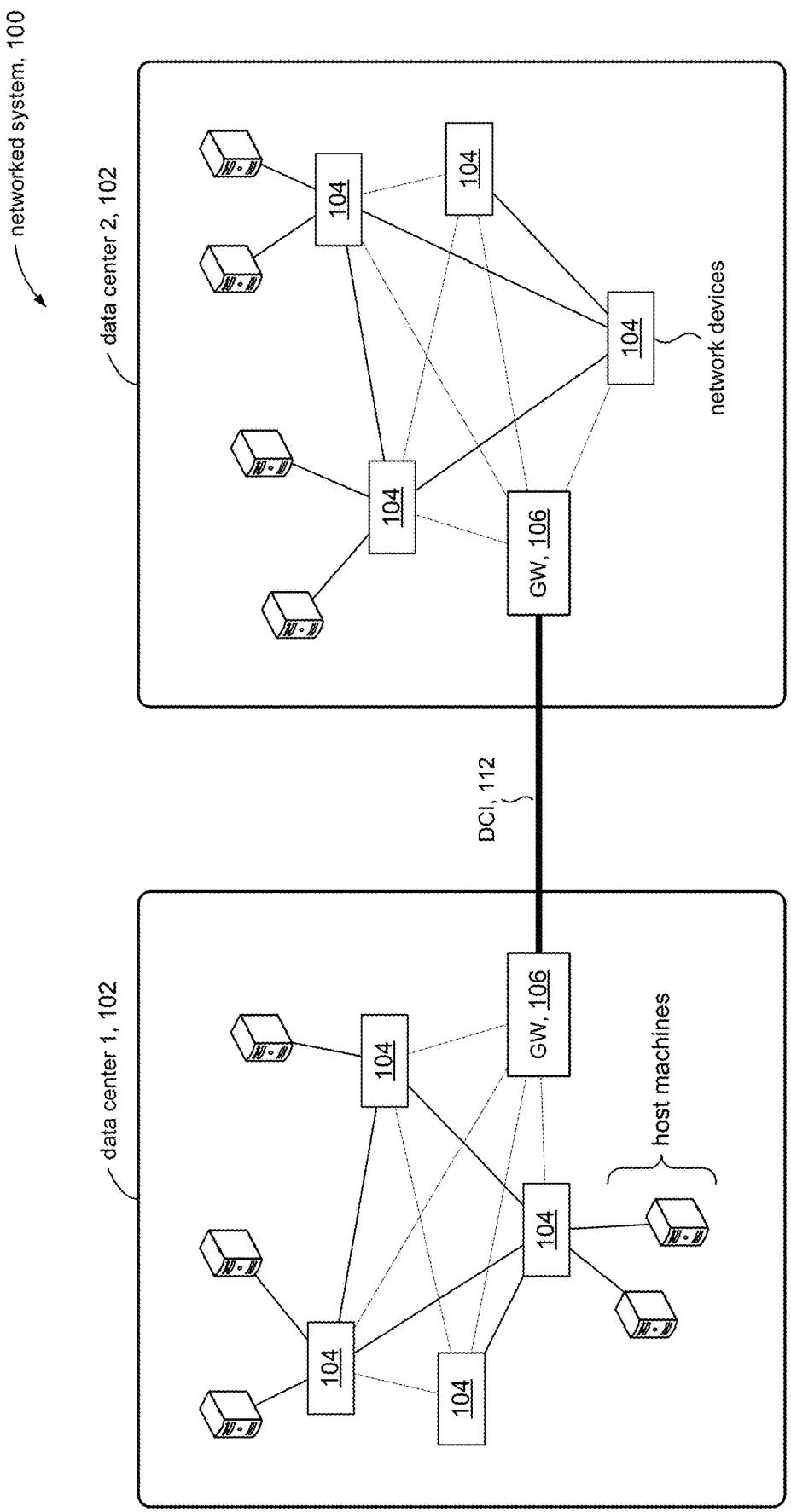
FIG. 1 represents a system diagram showing gateway devices that can be adapted in accordance with the present disclosure.

FIG. 1 represents an illustrative example of a networked system 100 in accordance with the present disclosure. In some embodiments, for example, networked system 100 comprises two or more data centers 102. Although only two data centers are depicted for simplicity, it will be appreciated that the present disclosure can be adapted for more than two data centers. Each data center 102 can include a network of switches, routers, MLAG (multi-chassis link aggregation group) pairs, and so on (collectively referred to as network devices 104) to support communication among host machines (clients, servers, storage, etc.) within the data center.

Each data center 102 is configured independently of the other data center. For example, networks such as VLANs (virtual local area networks) defined in data center 1 are separate from networks defined in data center 2.

Each data center 102 can include at least one network device (gateway node 106) that allows host machines connected in one data center to communicate with host machines connected in the other data center. A data center interconnect (DCI) 112 provides a communication link between gateway nodes 106. Traffic between a host in one data center and a host in another data center flows through respective gateway nodes 106 across DCI 112.

Figure 2:
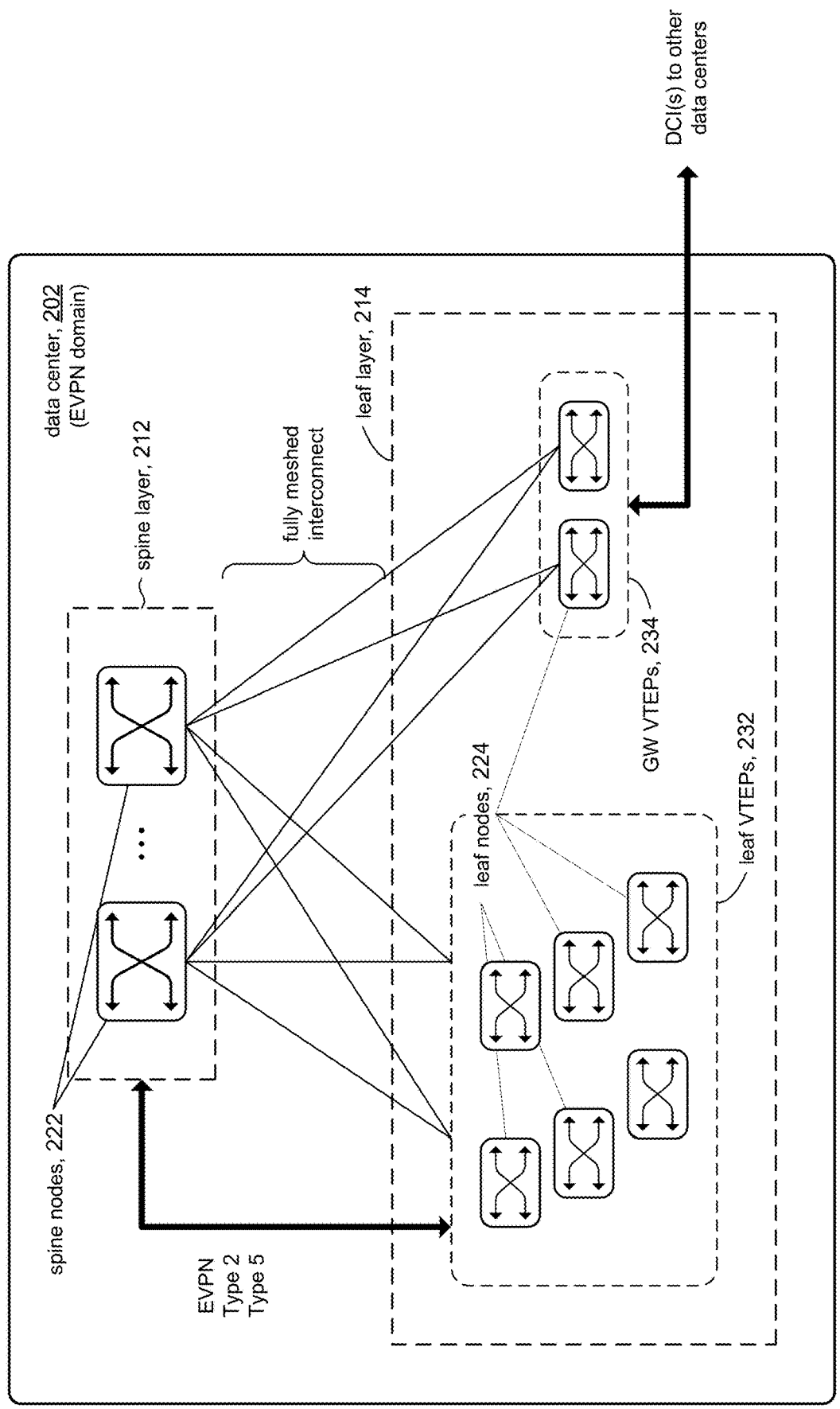
FIG. 2 represents details for a network device in accordance with some embodiments.

FIG. 2 is a schematic representation of a data center in accordance with some embodiments; host machines are omitted to simplify the figure. Merely for purposes of explaining aspects of the present disclosure, data center 202 will be described using a network architecture commonly referred to as a spine-leaf topology. It will be understood, however, that in other embodiments, data center 202 can be based on any suitable network architecture.

The spine-leaf architecture includes spine layer 212 comprising network devices referred to as spine nodes 222, and leaf layer 214 comprising network devices referred to as leaf nodes 224. Although not explicitly shown in the schematic representation of FIG. 2, in some embodiments, each leaf node 224 can be connected to each spine node 222 to obtain a full-mesh topology. It will be understood, however, in some embodiments full-mesh peering may not be implemented as an optimization. Host machines (not shown) connect to the leaf nodes. Network traffic between two host machines that are connected to different leaf nodes pass through the spine layer.

Merely for discussion purposes, networking in data center 202 will be described using VxLANs (virtual extensible local area networks), although it will be understood that in other embodiments, any suitable network technology can be deployed in data center 202. VxLAN is known. Briefly, VxLAN supports an overlay network, which comprises a virtual or logical network (the overlay network) that is created on top of a physical network (the underlay network). Overlay networks based on VxLANs transport frames in VxLAN packets along virtual tunnels. Endpoints of the tunnels comprise network devices configured as VTEPs (VxLAN tunnel endpoints). Host machines connect to the VTEPs for transmission and reception of frames through the virtual tunnels. A VTEP receives frames from a connected host and encapsulates the host frames for transmission as VxLAN packets, and conversely decapsulates received VxLAN packets to recover host frames for delivery to the destination host. In accordance with some embodiments, a subset of leaf nodes 224 can be configured as VTEPs (leaf VTEPs 232) to support the traffic in data center 202. Another subset of leaf nodes 224 can be configured as VTEPs to serve as gateways (e.g., gateway VTEPs 234) to transport traffic between data centers.

In accordance with some embodiments, data center 202 can be configured with EVPN (Ethernet VPN). EVPN is a BGP (border gateway protocol) based control plane mechanism for VxLAN that enables leaf VTEPs 232 to exchange (advertise) reachability information with each other. Reachability information (routes) include MAC-IP bindings (Type 2 routes) and IP Prefixes (Type 5 routes). Although EVPN supports other route types (e.g., Type 1, Type 3, Type 4), such routes are not the subject of the present disclosure and so will not be described. BGP and EVPN are known; additional details are described in the following technical references promulgated by the IEEE (Institute of Electrical and Electronics Engineers), each of which is included herein by reference for all purposes:

RFC 4271—A Border Gateway Protocol 4 (BGP-4)
RFC 4760—Multiprotocol Extensions for BGP-4
RFC 7432—BGP MPLS-Based Ethernet VPN
RFC 9136—IP Prefix Advertisement in Ethernet VPN (EVPN)

The logical boundary within which the various EVPN route types are exchanged constitutes an EVPN domain. Referring back to FIG. 2 for example, leaf VTEPs 232 and peer gateway VTEPs 234 in data center 202 can be deemed to constitute an EVPN domain to the extent that the leaf VTEPs exchange EVPN routes with each other and the gateway VTEP. Leaf VTEPs 232 can exchange (advertise) EVPN routes with each other by transmitting the routes to spine nodes 222 in the spine layer 212 which then broadcast the received routes back to leaf VTEPs 232 and to gateway VTEPs 234.

Figure 3:
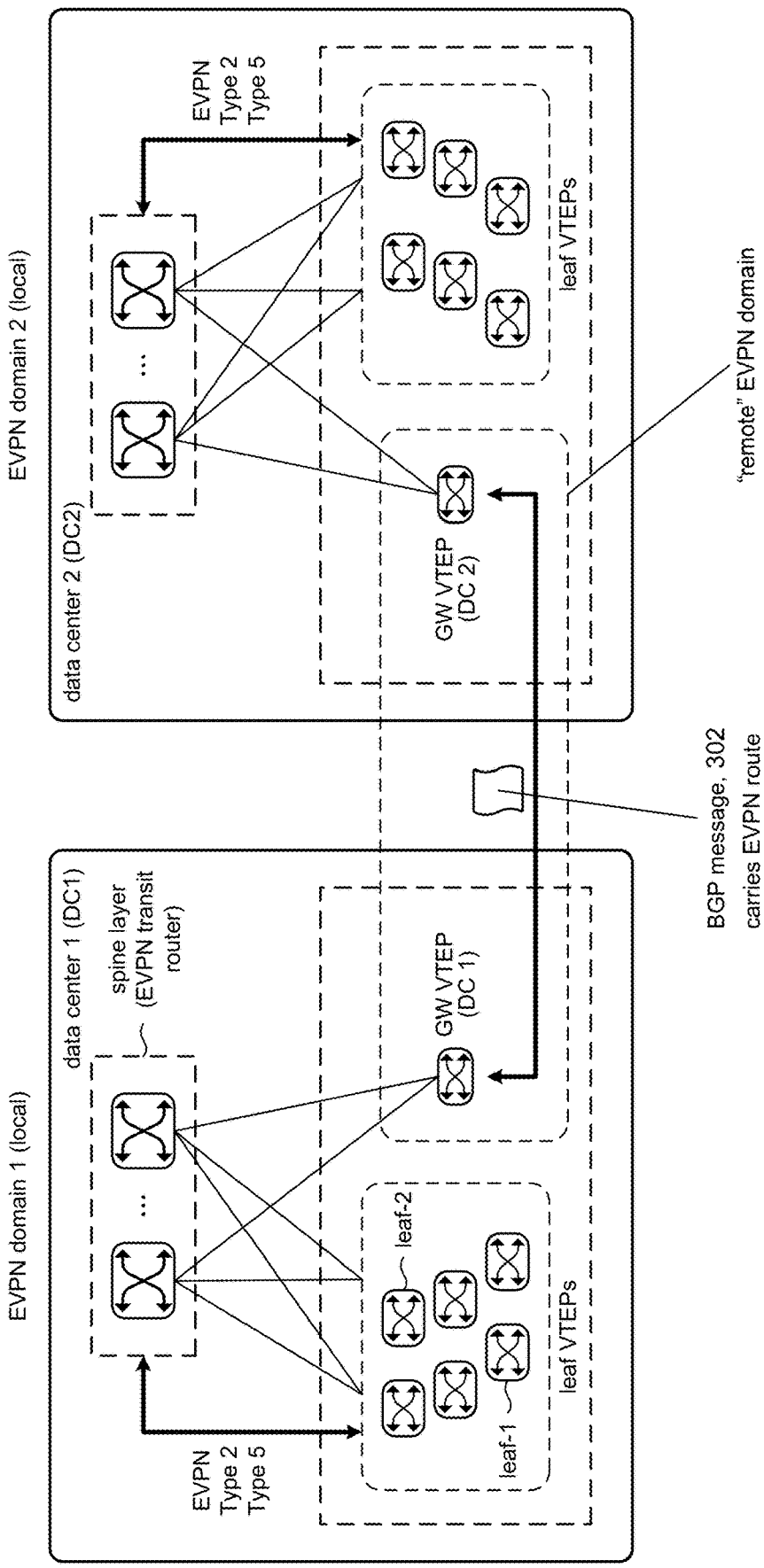
FIG. 3 illustrates a configuration of data centers in accordance with some embodiments.

Referring to FIG. 3, Type 2 and Type 5 routes can be advertised across EVPN domains in accordance with the present disclosure. FIG. 3, for example, shows two data centers where each data center constitutes an EVPN domain. Type 2 routes advertised by leaf VTEPs in one domain can become known in other domains. Some Type 2 routes advertised by leaf VTEPs in EVPN domain 1 can be advertised as is to other domains (e.g., EVPN domain 2). In accordance with some embodiments of the present disclosure, some Type 2 routes can be aggregated (summarized) and advertised as a Type 5 route ("route type conversion"). Likewise, some Type 5 routes can be advertised to other domains as is. However in accordance with some embodiments of the present disclosure, some Type 5 routes can be aggregated (summarized) and advertised as an "aggregated" Type 5 route ("route aggregation").

FIG. 3 shows that in some embodiments the gateway VTEPs can exchange Type 2, Type 5, and aggregated Type 5 routes (e.g., carried in BGP message 302) with each other to distribute routes between the EVPN domains. For example, the gateway VTEP in domain 1 can receive routes from peer leaf VTEPs in domain 1 and then advertise those routes across EVPN domains via a data center interconnect (e.g., 112, FIG. 1) to gateway VTEPs in other domains. From the point of view of a given gateway VTEP, the gateways between the data centers that exchange routes with each other collectively constitute a "remote" EVPN domain, as compared to a "local" EVPN domain comprising leaf VTEPs and peer gateway VTEPs within a data center (e.g., FIG. 2).

Referring to FIGS. 4, 5A-5B, 6A-6B, and 7, the discussion will now turn to a high-level description of processing in a network device (e.g., gateway 106, gateway VTEP 234) for receiving and aggregating (summarizing) reachability information in accordance with the present disclosure. In some embodiments, for example, the network device can include one or more digital processing units, which when operated, can cause the network device to perform processing in accordance with FIG. 4. Digital processing units can include general CPUs in the control plane of the network device that operate by way of executing computer program code stored on a non-volatile computer readable storage medium (e.g., read-only memory); for example, CPU 908 in the control plane (FIG. 9) can be a general CPU. Digital processing units can include specialized processors in the data plane of the network device, such as digital signal processors, field programmable gate arrays, application specific integrated circuits, and the like, that operate by way of executing computer program code or by way of logic circuits being configured for specific operations. For example, packet processors $912a$-$912p$ in the data plane (FIG. 9) can be specialized processors. The operation and processing blocks described below are not necessarily executed in the order shown. Operations can be combined or broken out into smaller operations in various embodiments. Operations can be allocated for execution among one or more concurrently executing processes and/or threads.

Merely, for discussion purposes, the configuration of FIG. 3 will serve as an illustrative example to provide context for the operation described below. More specifically, the operations will be explained with respect to processing by the gateway VTEP (network device) in data center 1. Although FIG. 3 shows one gateway VTEP in each data center, it will be understood that data centers in general can be configured with more than one gateway VTEP. It will be further understood that each gateway VTEP can perform the operations shown in FIG. 4.

At operation 402, the network device can receive reachability information. With reference to FIG. 3, for example, the gateway VTEP in DC1 can receive reachability information from the leaf VTEPs in dc1 via the spine layer acting as an EVPN transit router. Leaf VTEPs can advertise reachability information by first transmitting the information to the spine layer. Spine nodes in the spine layer can then broadcast the received reachability information to the other leaf VTEPs and to the gateway VTEP. In the context of the configuration shown in FIG. 3, the reachability information can be expressed as EVPN routes. For purposes of the present disclosure, Type 2 and Type 5 routes are discussed. The gateway VTEP can receive Type 2 MAC-TP routes or Type 5 routes from the leaf VTEPs in the data center.

At operation 404, the network device can update its local forwarding tables based on information contained in the received reachability information; e.g., Type 2 and Type 5 routes. Consider first a Type 2 route. A Type 2 route is used to share MAC-IP bindings among leaf and gateway VTEPs in the data center; leaf VTEPs advertise Type 2 routes to gateway VTEPs. Referring to the illustrative example shown in FIG. 5A, a Type 2 route advertised by a leaf VTEP contains a MAC address and an IP address (e.g., 192.128.10.128/32; note that the IP address field can be IPv4 or IPv6) of a host connected to that leaf VTEP. The network device can update its local forwarding tables to contain a mapping between the MAC address and the host IP address specified in each received Type 2 route. This information informs the network device the destination MAC address when forwarding a packet with a given IP address.

Consider next a Type 5 route. Referring to the illustrative example shown in FIG. 5B, a Type 5 route contains an IP prefix (e.g., 192.128.10.0/24) that informs a receiving leaf VTEP that the sending leaf VTEP (BGP speaker) is on the network identified by the IP prefix or has a valid route to reach the network identified by the IP prefix. The network device can update its local mapping tables to store the prefix-to-leaf VTEP mapping specified in each received Type 5 route. The network device will update its routing table with the received routes. The routing table will have a mapping of routes and next-hop: route=IP prefix and next hop=originating leaf VTEP.

At operation 406, the network device can receive, detect, or otherwise be triggered by an event to perform route aggregation in accordance with the present disclosure. For example, during initial convergence (e.g., when the leaf VTEPs and gateway VTEPs are first powered up), the gateway VTEP can wait for an EOR (end of RIB) marker from its neighbors. EOR indicates that the RIB (routing information base) has reached the end; i.e., all the routes from a connected neighbor are received. While waiting for the EOR marker, the gateway VTEP can be receiving advertised Type 2 and Type 5 routes and updating its local tables. In response to receiving the EOR marker from all the connected neighbors, the gateway VTEP can proceed with operation 408 to begin aggregating routes in accordance with the present disclosure.

As another example, the gateway VTEP can be triggered when it receives an update message indicating the occurrence of an update event (e.g., addition or deletion of routes), subsequent to initial convergence. The gateway VTEP can proceed with operation 408 to begin aggregating routes it had received prior to getting the update message.

In some embodiments, the gateway VTEP can run a timer subsequent to initial convergence. The gateway VTEP can receive advertised routes while the timer is running. Expiration of the timer can serve as a trigger to begin aggregating routes in response to expiration of the timer. The gateway VTEP can use the timer to periodically check for and aggregate any received routes. In general, any suitable triggering mechanism can be used to trigger route aggregation in accordance with the present disclosure on a repeating (periodic or aperiodic) basis.

At operation 408, the network device can aggregate (summarize) previously received reachability information. Continuing with the example in FIG. 3, in accordance with some embodiments, the network device can aggregate previously received Type 2 routes and Type 5 routes. Each route type will be discussed:

Type 5 Routes

In accordance with some embodiments, the network device may be able to aggregate at least some of the received Type 5 routes using a known technique referred to as supernetting. Supernetting aggregates or otherwise combines a set of subnetworks into a larger network sometimes referred to as a "supernet." It is understood that certain constraints may limit which subnetworks can be combined (supernetted). One constraint, for example, is that the subnets should be contiguous. For instance, 10.0.0.0/24 and 10.0.1.0/24 are deemed contiguous subnets because they represent a contiguous range of addresses:

prefix 10.0.0.0/24 represents the IP address range 10.0.0.0/32-10.0.0.255/32, and
prefix 10.0.1.0/24 represents the IP address range 10.0.1.0/32-10.0.1.255/32;
address 10.0.1.0/32 picks up right after 10.0.0.255/32. Accordingly, 10.0.0.0/24 and 10.0.1.0/24 can be combined to yield a supernet defined by the prefix 10.0.0.0/23. However, 10.0.0.0/24 and 10.0.9.0/24 are not contiguous and should not be combined. It will be understood that additional constraints may be imposed.

In accordance with some embodiments, the network device can identify and combine IP prefixes among received Type 5 routes. For discussion purposes, the resulting combined IP prefixes can be referred to as Type 5* aggregated IP prefixes. The "Type 5*" designation is a descriptive convention adopted only for the purpose of explaining the present disclosure and serves to signify that the aggregated IP prefix was generated by aggregating IP prefixes received in Type 5 routes. It is not to be confused with BGP EVPN Type 5 routes.

Type 2 Routes

In accordance with some embodiments, the network device may be able to aggregate at least some of the previously received Type 2 routes by supernetting the host IP addresses specified in the routes. As with IP prefixes, it is understood that certain constraints may limit which IP addresses can be combined; e.g., the IP addresses should be contiguous. In accordance with some embodiments, the network device can identify and combine IP addresses among the received Type 2 routes. For example, aggregating IP addresses 10.0.9.2/32 and 10.0.9.3/32, which are contiguous, yields an IP prefix of 10.0.9.2/31. For discussion purposes only, an IP prefix produced by aggregating IP addresses received in Type 2 routes will be identified as a Type 2* aggregated IP prefix. The "Type 2*" designation is a descriptive convention adopted only for the purpose of explaining the present disclosure and serves to signify that the aggregated IP prefix was generated by aggregating IP addresses received in Type 2 routes. It is not to be confused with BGP EVPN Type 2 routes. A Type 2* IP prefix is advertised in a Type 5 route.

At operation 410, the network device can generate aggregated reachability information for transmission. In accordance with some embodiments and continuing with the example in FIG. 3, one or more Type 5* aggregated IP prefixes generated at operation 408 can be advertised to gateway VTEPs in other data centers in Type 5 routes. Likewise, one or more Type 2* aggregated IP prefixes generated at operation 408 can be advertised to gateway VTEPs in other data centers in Type 5 routes. Recall from above, and shown in FIG. 3, the gateway VTEPs can be collectively viewed as a "remote" EVPN domain. Accordingly, in some embodiments, the Type 5* IP prefixes and Type 2* IP prefixes can be advertised only among the gateway VTEPs that constitute the remote EVPN domain. Additional details for Type 5* and Type 2* IP prefixes will now be described.

Type 5* IP Prefix

Figure 6A:
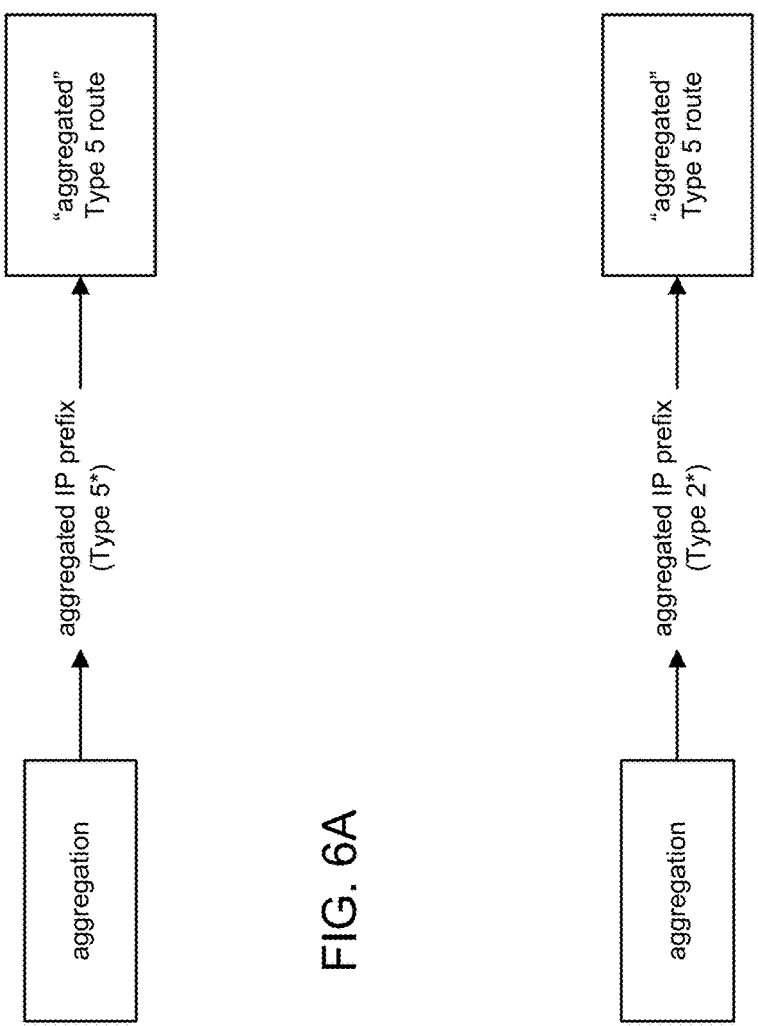
FIGS. 6A, 6B are schematic diagrams that illustrate Type 2 and Type 5 aggregation in accordance with the present disclosure.

Referring for a moment to FIG. 6A, the figure schematically illustrates that IP prefixes in received Type 5 routes can be aggregated to produce an aggregated IP prefix (Type 5*). As shown in the figure, in accordance with some embodiments the aggregated IP prefix can be inserted in a Type 5 route that can then be advertised to other gateway VTEPs in the remote EVPN domain. For discussion purposes, the Type 5 route is designated an "aggregated" Type 5 route to indicate that the route contains an aggregated IP prefix.

Although the example in FIG. 6A shows the production of a single Type 5* aggregated IP prefix, it will be understood that in some instances previously received Type 5 routes may not all be combinable to produce one IP prefix but rather multiple IP prefixes. In such cases, it will be understood that each IP prefix produced can be advertised in a separate respective aggregated Type 5 route.

Type 2* IP Prefix

Figure 6B:
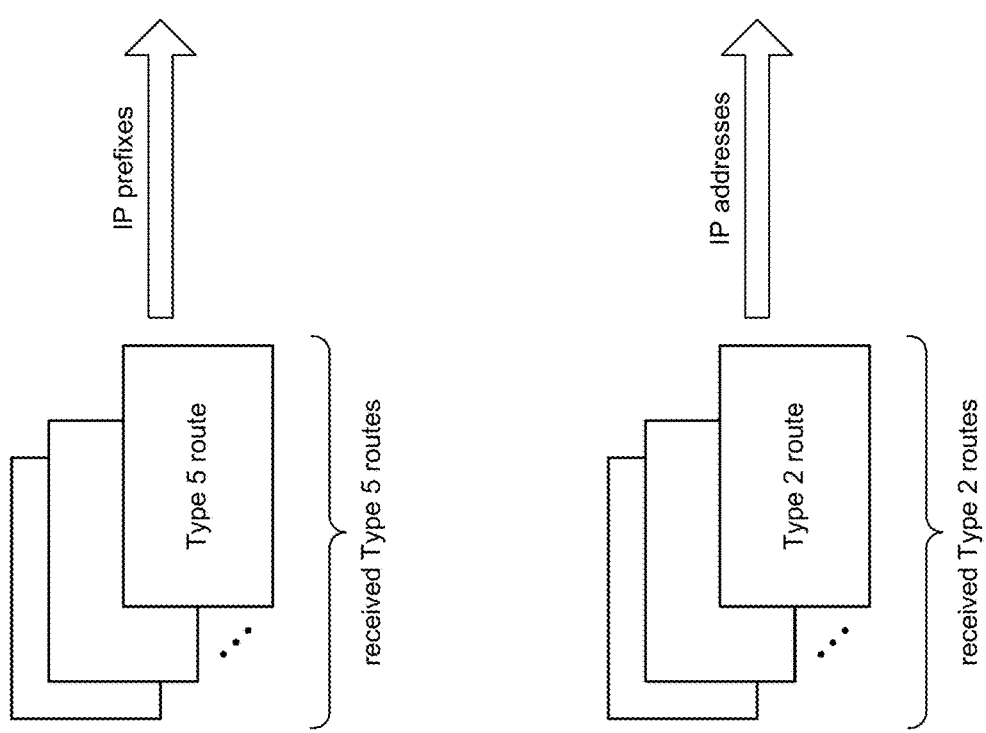

Continuing with the discussion of operation 410, further in accordance with an aspect of the present disclosure, previously received Type 2 routes can be aggregated and translated to produce a Type 5 route (referred to herein as route conversion). FIG. 6B schematically illustrates this aspect of the present disclosure. IP prefixes in received Type 2 routes can be aggregated to produce a Type 2* aggregated IP prefix. The aggregated IP prefix can be inserted in a Type 5 route (route conversion) that can then be advertised to other gateway VTEPs in the remote EVPN domain. The Type 5 route is designated an "aggregated" Type 5 route to indicate that the route contains an aggregated IP prefix.

It will be understood that in some instances, previously received Type 2 routes may not all be combinable to produce a single IP prefix (as depicted in FIG. 6B) but rather multiple IP prefixes. In such cases, it will be understood that each IP prefix that is produced can be advertised in a separate respective aggregated Type 5 route.

Figure 7:
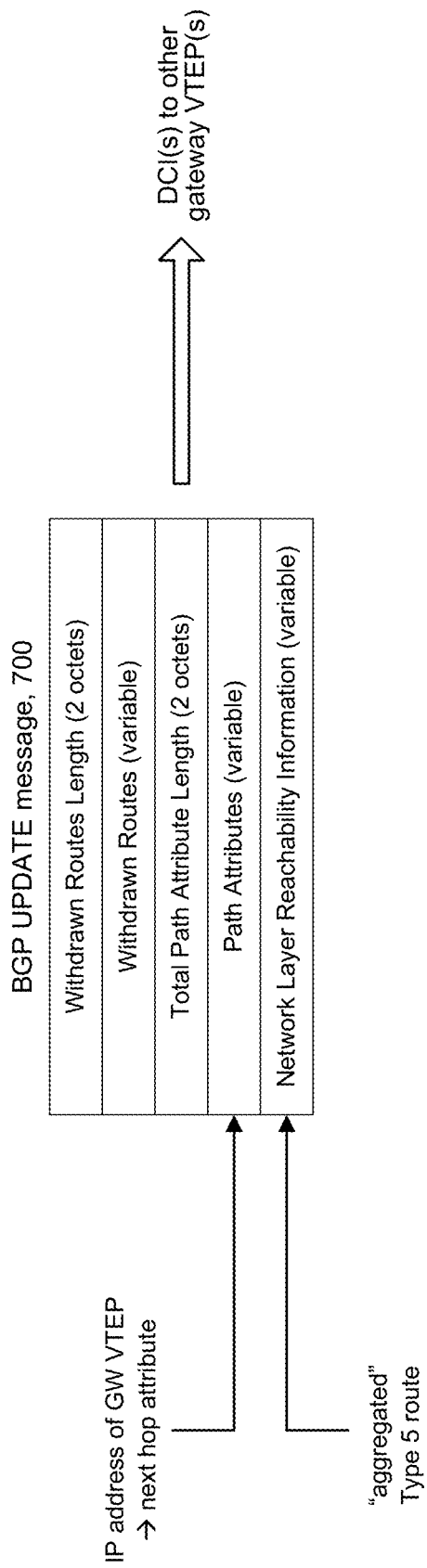
FIG. 7 is a schematic illustration for generating a BGP update message in accordance with some embodiments.

At operation 412, the network device can advertise the aggregated reachability information. In some embodiments, for example, the aggregated Type 5 routes shown in FIGS. 6A and 6B can be advertised to other gateway VTEPs in BGP update messages. FIG. 7 illustrates an example of a BGP update message 700, showing various data fields that constitute the update message. Each Type 5 route can be carried in an update message. More specifically, the Type 5 route can be inserted in the NLRI (network layer reachability information) data field. The IP address of the network device (e.g., gateway VTEP) that advertises the route can be inserted as the "next hop" attribute in the Path Attributes data field. The next hop informs the receiving gateway VTEP that the IP address should be used as the next hop to the destinations listed in the route contained in the NLRI. Aggregation processing can be deemed complete. Processing can continue with operation 406 to repeat the process in response to the next trigger.

A gateway VTEP that receives the aggregated Type 5 route can install the route in its local forwarding tables like any other Type 5 route. More specifically, the IP prefix contained in the Type 5 route is installed in a forwarding table that maps or otherwise associates the IP prefix with the IP address in the next hop attribute, namely the IP address of the sender of the Type 5 route.

Figure 4:
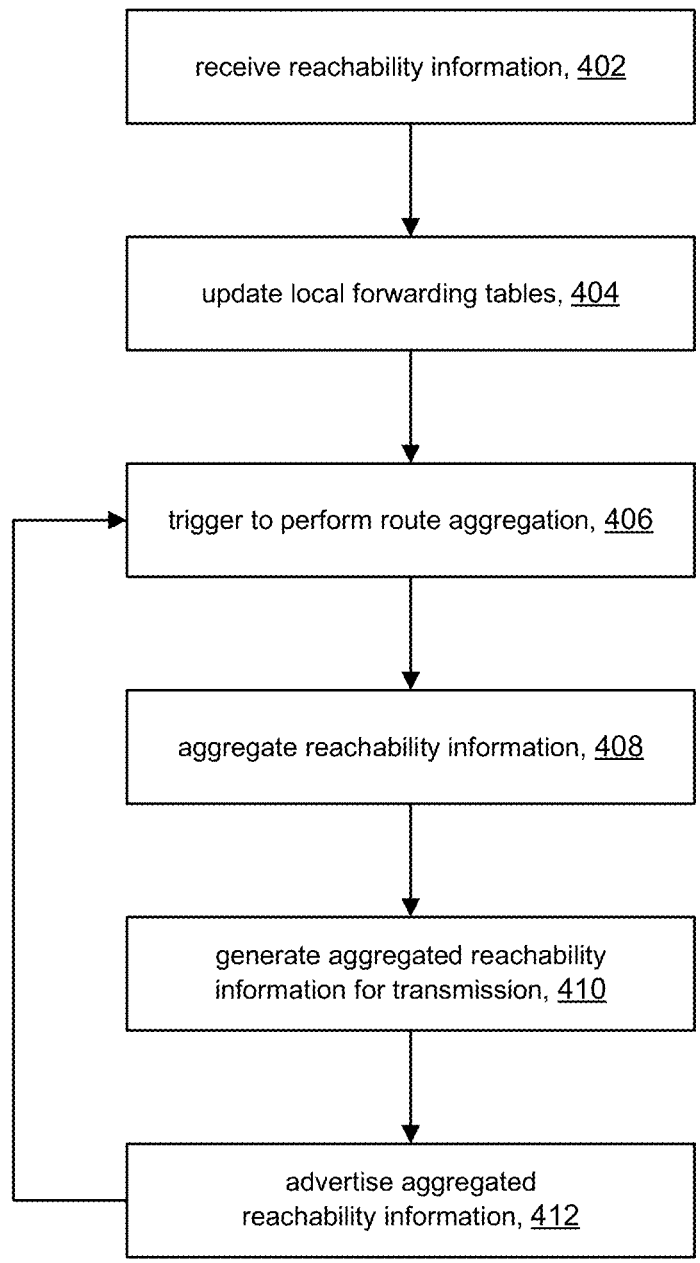
FIG. 4 is a high level flow of operations in a network device in accordance with the present disclosure.
Figure 5A:
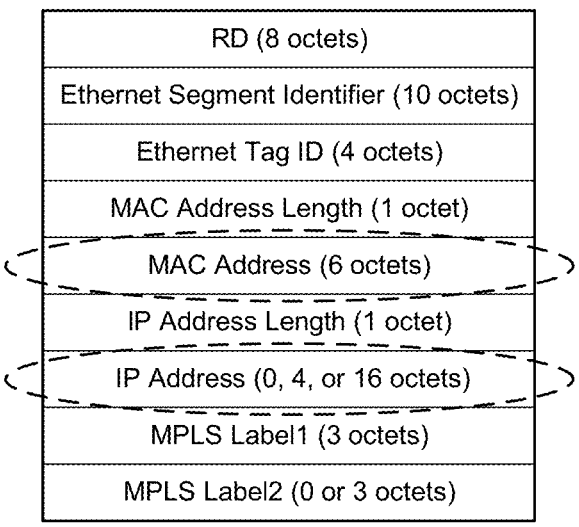
FIGS. 5A, 5B are illustrative examples of Type 2 and Type 5 routes, respectively.
Figure 5B:
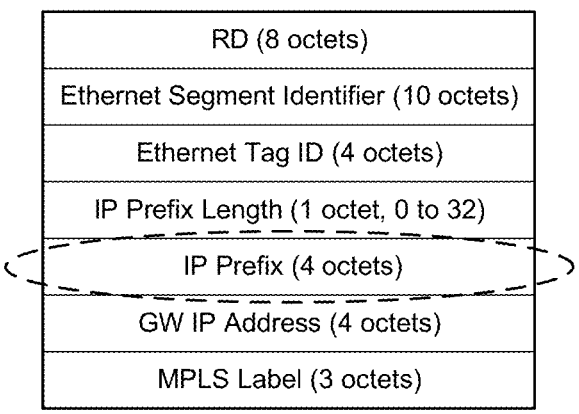

The discussion will now turn to FIG. 8 to illustrate the operations in FIG. 4 with an example. Table 800 in FIG. 8 shows EVPN routes that originate on leaf-1 and leaf-2 VTEPs in data center 1 (FIG. 3). Although the examples use IPv4 addresses, it will be appreciated that the present disclosure is applicable to IPv6 addresses.

Column 802 shows the IP prefixes of subnets for each SVI (switch virtual interface) in a given leaf VTEP. For example, table 800 indicates that the leaf-1 VTEP is associated with eight different subnets via eight respective virtual interfaces. Likewise for the leaf-2 VTEP.

Column 804 shows IP addresses of hosts in the 10.0.9.0/24 subnet that are connected to the leaf-1 and leaf-2 VTEPs. For instance, column 804 indicates there are two hosts connected to leaf-1 VTEP having IP addresses 10.0.9.2/32 and 10.0.9.3/32. Column 804 further shows five hosts (0.4, 0.5, 0.6, 0.7, and 0.12) in the 10.0.9.0/24 subnet that are connected to the leaf-2 VTEP.

Leaf-1 VTEP will advertise the following Type 2 routes:
Type 2 route with IP address 10.0.9.2/32
Type 2 route with IP address 10.0.9.3/32
Leaf-2 VTEP will likewise advertise the following Type 2 routes:
Type 2 route with IP address 10.0.9.4/32
Type 2 route with IP address 10.0.9.5/32
Type 2 route with IP address 10.0.9.6/32
Type 2 route with IP address 10.0.9.7/32
Type 2 route with IP address 10.0.9.12/32

Each of the leaf-1 and leaf-2 VTEPs will advertise the following Type 5 routes:
Type 5 route with IP prefix 10.0.0.0/24
Type 5 route with IP prefix 10.0.1.0/24
Type 5 route with IP prefix 10.0.2.0/24
Type 5 route with IP prefix 10.0.3.0/24
Type 5 route with IP prefix 10.0.4.0/24
Type 5 route with IP prefix 10.0.5.0/24
Type 5 route with IP prefix 10.0.6.0/24
Type 5 route with IP prefix 10.0.7.0/24
Type 5 route with IP prefix 10.0.9.0/24

The advertised routes will be received by other leaf VTEPs and the gateway VTEP in DC1.

Column 806 shows the routes generated by the gateway VTEP in accordance with the present disclosure. Route 812, for instance, is the IP prefix 10.0.0.0/21 produced by combining (supernetting) the group 822 of IP prefixes from eight of the Type 5 routes advertised by the leaf-1 VTEP and the leaf-2 VTEP. Note that the 10.0.9.0/24 subnet is omitted from the supernet because it is not contiguous with the group 822 subnets. The gateway VTEP will generate a single Type 5 route that specifies the IP prefix of route 812, namely 10.0.0.0/21 which represents a subnet that contains the individual subnets in group 822. The gateway VTEP will create a BGP update message (FIG. 7) comprising the Type 5 route and insert itself as the next hop (i.e., setting the next hop attribute equal to the IP address of the gateway VTEP) in the path attribute of the update message, and transmit the update message to gateway VTEPs in other data centers.

Route 814 is the aggregated IP prefix produced by combining the IP addresses from the Type 2 routes advertised by each of leaf-1 VTEP and leaf-2 VTEP, identified as group 824, to yield the IP prefix 10.0.9.0/29. Note that the 10.0.9.12/32 address is omitted from the supernet because it is not contiguous with the group 824 of IP addresses. The gateway VTEP will generate a single Type 5 route that specifies the IP prefix of route 814, thus combining and translating multiple Type 2 routes to a single Type 5 route. The gateway VTEP will create a BGP update message (FIG. 7) comprising the Type 5 route and insert itself as the next hop, and transmit the BGP message to gateway VTEPs in other data centers.

Route 816 is the IP prefix 10.0.9.0/24 received in a Type 5 route advertised by the leaf-1 and leaf-2 VTEPs. As noted above, this prefix is not contiguous with the group 822 prefixes and so could not be combined. Accordingly, route 816 is advertised in a Type 5 route, as is, to gateway VTEPs in other data centers.

Route 818 is the IP address 10.0.9.12/32 received in a Type 2 route advertised by the leaf-2 VTEP. As noted above, this address is not contiguous with the group 824 addresses and so could not be combined. Accordingly, route 818 is advertised to gateway VTEPs in other data centers, as is, in a Type 2 route.

Advertising reachability information across EVPN domains in accordance with the present disclosure can reduce control plane traffic. Instead of advertising n Type 2 or Type 5 routes (e.g., via BGP update messages), advertising routes in accordance with the present disclosure can reduce that number of routes. Likewise, advertising reachability information across domains in accordance with the present disclosure can reduce storage requirements for storing the reachability information in the hardware tables of a receiving gateway VTEP. Instead of providing entries to store n received routes, the present disclosure can reduce the number of routes that are advertised and hence the number of entries that have to be stored.

Referring again to FIGS. 3 and 8, for example, advertising reachability information in accordance with conventional prior art would result in the gateway VTEP in DC 1 receiving eighteen Type 5 routes (column 802) and seven Type 2 routes (column 804); leaf-1 VTEP would advertise nine Type 5 routes and two Type 2 routes, leaf-2 VTEP would advertise nine Type 5 routes and five Type 2 routes. Although not represented in FIG. 8, the gateway VTEP in DC 1, in turn, would advertise the eighteen Type 5 routes and seven Type 2 routes to the gateway VTEP in DC 2. The gateway VTEP in DC 2 would then provide storage for the received routes.

By contrast, processing reachability information in accordance with the present disclosure involves the gateway VTEP in DC 1 aggregating the Type 5 routes and Type 2 routes it receives from the local leaf VTEPs (e.g., leaf-1, leaf-2). As represented in FIG. 8, the aggregation would result in three Type 5 routes and one Type 2 route (column 806), which would be advertised to the gateway VTEP in DC 2. The gateway VTEP in DC 2 would then need to provide storage for only three Type 5 routes and one Type 2 route, as compared to the eighteen Type 5 routes and seven Type 2 routes noted above.

Figure 9:
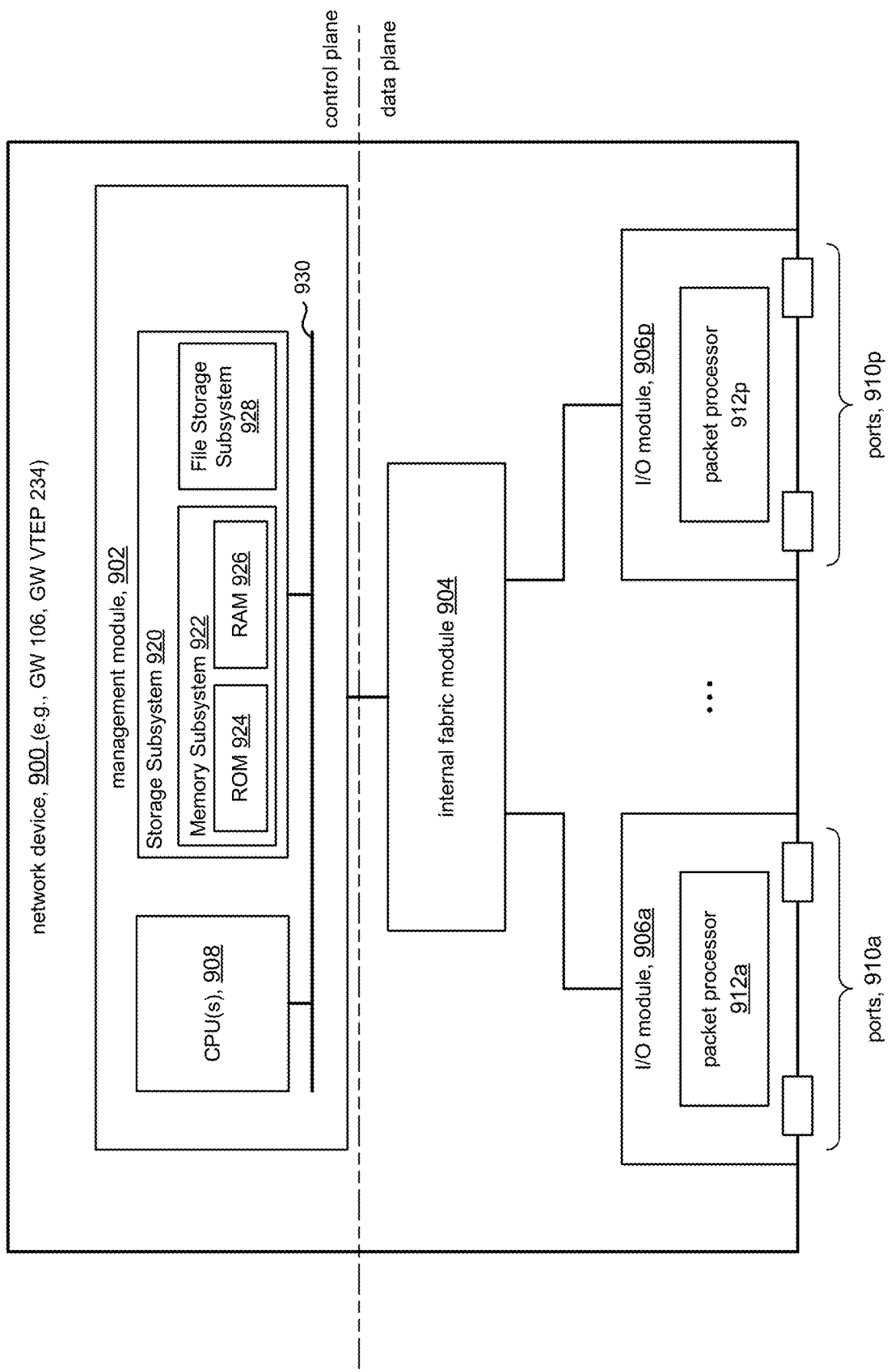
FIG. 9 represents a network device in accordance with some embodiments.

FIG. 9 depicts an example of a network device 900 (e.g. GW 106, GW VTEP 234) in accordance with some embodiments of the present disclosure. As shown, networking device 900 includes a management module 902, an internal fabric module 904, and a number of I/O modules 906a-906p. Management module 902 includes the control plane (also referred to as control layer or simply the CPU) of networking device 900 and can include one or more management CPUs 908 for managing and controlling operation of networking device 900 in accordance with the present disclosure. Each management CPU 908 can be a general-purpose processor, such as an Intel®/AMD® x86 or ARM® microprocessor, that operates under the control of software stored in a memory, such as random-access memory (RAM) 926. Control plane refers to all the functions and processes that determine which path to use, such as routing protocols, spanning tree, and the like.

Internal fabric module 904 and I/O modules 906a-906p collectively represent the data plane of networking device 900 (also referred to as data layer, forwarding plane, etc.). Internal fabric module 904 is configured to interconnect the various other modules of networking device 900. Each I/O module 906a-906p includes one or more input/output (ingress/egress) ports 910a-910p that are used by networking device 900 to send and receive network traffic. Each I/O module 906a-906p can also include a packet processor 912a-912p. Each packet processor 912a-912p can comprise a forwarding hardware component (e.g., application specific integrated circuit (ASIC), field programmable gate array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Management module 902 includes one or more management CPUs 908 that communicate with storage subsystem 920 via bus subsystem 930. Other subsystems, such as a network interface subsystem (not shown in FIG. 1), may be on bus subsystem 930. Storage subsystem 920 includes memory subsystem 922 and file/disk storage subsystem 928 represent non-transitory computer-readable storage media that can store program code and/or data, which when executed by one or more management CPUs 908, can cause one or more management CPUs 908 to perform operations in accordance with embodiments of the present disclosure.

Memory subsystem 922 includes a number of memories including main RAM 926 for storage of instructions and data during program execution, and read-only memory (ROM) 924 in which fixed instructions and data are stored. File storage subsystem 928 can provide persistent (i.e., non-volatile) storage for program and data files, and can include a magnetic or solid-state hard disk drive, and/or other types of storage media known in the art.

One or more management CPUs 908 can run a network operating system stored in storage subsystem 920. A network operating system is a specialized operating system for networking device 900 (e.g., a router, switch, firewall, and the like). For example, the network operating system may be Arista Extensible Operating System (EOS®), which is a fully programmable and highly modular, Linux-based network operating system. Other network operating systems may be used.

Bus subsystem 930 can provide a mechanism for letting the various components and subsystems of management module 902 communicate with each other as intended. Although bus subsystem 930 is shown schematically as a single bus, alternative embodiments of the bus subsystem can utilize multiple busses.

Further Examples

Features described above as well as those claimed below may be combined in various ways without departing from the scope hereof. The following examples illustrate some possible, non-limiting combinations:

(A1) A method in a network device, the method comprising: receiving a plurality of EVPN (Ethernet virtual private network) Type 5 routes, each EVPN Type 5 route including a network prefix; identifying a plurality of network prefixes from among a plurality of network prefixes obtained from the received EVPN Type 5 routes; summarizing the identified plurality of network prefixes to produce a summarized network prefix; generating an aggregated EVPN Type 5 route comprising the summarized network prefix and a next hop identifier that identifies the network device as a next hop; and advertising the aggregated EVPN Type 5 route.

(A2) For the method denoted as (A1), wherein the network device is in a first communication network, the method further comprising the network device advertising the aggregated EVPN Type 5 route to another network device in a second communication network.

(A3) For the method denoted as any of (A1) through (A2), wherein the network device in the first communication network is a gateway device, wherein the other network device in the second communication network is a gateway device.

(A4) For the method denoted as any of (A1) through (A3), wherein the identified plurality of network prefixes correspond to contiguous subnets.

(A5) For the method denoted as any of (A1) through (A4), further comprising advertising the aggregated EVPN Type 5 route in a BGP (border gateway protocol) update message.

(A6) For the method denoted as any of (A1) through (A5), wherein the network device is in a first communication network, wherein the network device receives EVPN Type 5 routes from other network devices in the first communication network, wherein the network device advertises the aggregated EVPN Type 5 route to a network device in a second communication network and not to the other network devices in the first communication network.

(A7) For the method denoted as any of (A1) through (A6), wherein summarizing the plurality of network prefixes includes defining a network prefix that contains the plurality of network prefixes.

(B1) A method in a network device, the method comprising: receiving a plurality of EVPN Type 2 routes, each EVPN Type 2 route including a MAC-IP binding; storing a MAC to IP mapping in a memory of the network device according to the MAC-IP binding in each received EVPN Type 2 route; summarizing a plurality of IP addresses in the plurality of EVPN Type 2 routes to produce a summarized network prefix; generating an aggregated EVPN Type 5 route comprising the summarized network prefix and a next hop identifier that identifies the network device as a next hop; and advertising the aggregated EVPN Type 5 route.

(B2) For the method denoted as (B1), wherein the network device is in a first communication network, wherein the network device advertises the aggregated EVPN Type 5 route to a network device in a second communication network.

(B3) For the method denoted as any of (B1) through (B2), wherein the network device in the first communication network is a gateway device, wherein the network device in the second communication network is a gateway device.

(B4) For the method denoted as any of (B1) through (B3), further comprising advertising the aggregated EVPN Type 5 route in a BGP (border gateway protocol) update message.

(B5) For the method denoted as any of (B1) through (B4), wherein the network device is in a first communication network, wherein the network device advertises the EVPN Type 5 route to a network device in a second communication network and not to other network devices in the first communication network.

(B6) For the method denoted as any of (B1) through (B5), wherein the summarized network prefix represents a subnet that encompasses the plurality of IP addresses.

(B7) For the method denoted as any of (B1) through (B6), wherein the first plurality of IP addresses are contiguous.

(C1) A network device in a first overlay network, the network device comprising: one or more computer processors; and a computer-readable storage medium comprising instructions for controlling the one or more computer processors to: receive a plurality of first overlay routes comprising a plurality of respective first routes; update one or more forwarding tables of the network device based on the plurality of first routes; combine the plurality of first routes to produce a second route; advertise a second overlay route comprising the second route to at least another network device in at least a second overlay network separate from the first overlay network.

(C2) For the network device denoted as (C1), wherein the plurality of first overlay routes are EVPN Type 5 routes and the plurality of first routes comprise first IP prefixes, wherein the second route comprises an IP prefix that represents an aggregation of the first IP prefixes.

(C3) For the network device denoted as any of (C1) through (C2), wherein the plurality of first overlay routes are EVPN Type 2 routes and the plurality of first routes are first IP addresses, wherein the second route is an IP prefix that represents an aggregation of the first IP addresses.

(C4) For the network device denoted as any of (C1) through (C3), wherein the second overlay route is an EVPN Type 5 route.

(C5) For the network device denoted as any of (C1) through (C4), wherein the network device is a gateway device, wherein the other network device in the other overlay network is a gateway device.

(C6) For the network device denoted as any of (C1) through (C5), wherein the plurality of first routes are contiguous routes.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method performed by a network device in a first network domain, the method comprising
receiving a plurality of EVPN (Ethernet virtual private network) Type 5 routes, each EVPN Type 5 route including a network prefix;
identifying a plurality of network prefixes from the received EVPN Type 5 routes;
summarizing the identified plurality of network prefixes to produce a summarized network prefix;
generating an aggregated EVPN Type 5 route comprising the summarized network prefix and a next hop identifier that identifies the network device as a next hop; and
advertising the aggregated EVPN Type 5 route to another network device in a second network domain different from the first network domain,
wherein the advertising of the aggregated EVPN Type 5 route communicates the summarized network prefix to said another network device in the second network domain while avoiding communication of the plurality of network prefixes to said another network device in the second network domain.

2. The method of claim 1, wherein the network device is a gateway device in the first network domain, and wherein said another network device is a gateway device in the second network domain.

3. The method of claim 1, wherein the identified plurality of network prefixes correspond to contiguous subnets.

4. The method of claim 1, further comprising advertising the aggregated EVPN Type 5 route in a BGP (border gateway protocol) update message.

5. The method of claim 1, wherein the network device receives the plurality of EVPN Type 5 routes from other network devices in the first network domain.

6. The method of claim 1, wherein summarizing the plurality of network prefixes includes defining a network prefix that contains the plurality of network prefixes.

7. A method performed by a network device in a first network domain, the method comprising:
receiving a plurality of EVPN Type 2 routes, each EVPN Type 2 route including a MAC-IP binding;
storing a MAC to IP mapping in a memory of the network device according to the MAC-IP binding in each received EVPN Type 2 route;

summarizing a plurality of IP addresses in the plurality of EVPN Type 2 routes to produce a summarized network prefix;

generating an aggregated EVPN Type 5 route comprising the summarized network prefix and a next hop identifier that identifies the network device as a next hop; and advertising the aggregated EVPN Type 5 route to another network device in a second network domain different from the first network domain, wherein the advertising of the aggregated EVPN Type 5 route communicates the summarized network prefix to said another network device in the second network domain while avoiding communication of the plurality of IP addresses to said another network device in the second network domain.

8. The method of claim 7, wherein the network device is a gateway device in the first network domain, and wherein said another network device is a gateway device in the second network domain.

9. The method of claim 7, further comprising advertising the aggregated EVPN Type 5 route in a BGP (border gateway protocol) update message.

10. The method of claim 7, wherein the network device receives the plurality of EVPN Type 2 routes from other network devices in the first network domain.

11. The method of claim 7, wherein the summarized network prefix represents a subnet that encompasses the plurality of IP addresses.

12. The method of claim 7, wherein the plurality of IP addresses are contiguous.

13. A network device in a first overlay network, the network device comprising:
one or more computer processors; and
a non-transitory computer-readable storage medium comprising instructions for controlling the one or more computer processors to:
receive a plurality of EVPN Type 5 routes comprising a respective plurality of IP prefixes;
update one or more forwarding tables of the network device based on the plurality of IP prefixes;
combine the plurality of IP prefixes to produce a summarized IP prefix that represents an aggregation of the plurality of IP prefixes;
advertise an overlay route comprising the summarized IP prefix to at least another network device in at least a second overlay network separate from the first overlay network, wherein the advertising of the overlay route communicates the summarized IP prefix to said another network device in the second overlay network while avoiding communication of the plurality of IP prefixes to said another network device in the second overlay network.

14. The network device of claim 13, wherein the second overlay route is an EVPN Type 5 route.

15. The network device of claim 13, wherein the network device in the first overlay network is a gateway device, wherein said another network device in the other second overlay network is a gateway device.

16. The network device of claim 13, wherein the plurality of first IP prefixes are contiguous IP prefixes.

* * * * *